United States Patent Office 3,242,181
Patented Mar. 22, 1966

3,242,181
ANTHRAQUINONE DYES WITH HALOGEN-PYRIDAZONE RADICALS
Hans Ruprecht Hensel, Heidelberg, Hans Baumann, Ludwigshafen (Rhine), Arnold Tartter, Lambsheim, Pfalz, and Hermann Weissauer, Ludwigshafen (Rhine), Germany, assignors to Badische Anilin- & Soda-Fabrik Aktiengesellschaft, Ludwigshafen (Rhine), Germany
No Drawing. Original application Jan. 24, 1961, Ser. No. 84,524, now Patent No. 3,126,369, dated Mar. 24, 1964. Divided and this application Aug. 22, 1963, Ser. No. 303,920
Claims priority, application Germany, Jan. 29, 1960, B 56,432; Aug. 18, 1960, B 59,016
5 Claims. (Cl. 260—262)

This is a division of application Serial No. 84,524 filed January 24, 1961, now Patent No. 3,126,369 which issued March 24, 1964.

This invention relates to anthraquinone dyes which bear 4,5-dihalogenpyridazone-(6) radicals in the molecule, to a process for their production and to their use for dyeing textile materials of natural, semi-synthetic and fully synthetic materials.

The term "textile materials" includes fibers, filaments, threads, flock, woven and non-woven fabrics, sheeting and films. Natural materials include, for example, natural polyamides, such as wool and silk; semi-synthetic materials include, for example, materials of regenerated cellulose, such as rayon and rayon staple. Fully synthetic materials include especially the synthetic linear polyamides, such as nylon 6, nylon 66 and nylon 11, the synthetic linear polyurethanes and the esters and ethers of cellulose, such as cellulose-2½-acetate, cellulose triacetate and ethyl cellulose.

It is an object of this invention to provide new anthraquinone dyes which will dye the said textile materials brilliant shades with excellent fastness properties, in particular with excellent fastness to wetting, rubbing and light.

More specifically, the invention relates to anthraquinone dyes which contain one or more radicals of the general formula:

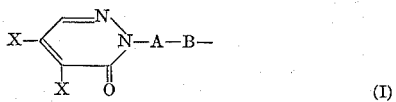

(I)

combined by way of an amino group to the remaining part of the dye molecule. In the said formula, X denotes a halogen atom, preferably a chlorine or bromine atom, A denotes a phenylene or low molecular weight alkylene radical which may be substituted by other radicals, for example by alkyl and alkoxy radicals or, in the case of a phenylene radical, also by nitro and halogen radicals, and B denotes an —SO$_2$— or —CO-group.

The new anthraquinone dyes according to this invention are obtained by reacting anthraquinone dyes containing acylatable amino groups with compounds of the general formula:

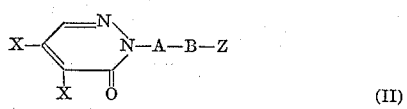

(II)

in which X, A and B have the meanings given above and Z stands for a halogen atom, preferably a chlorine atom.

Among the large number of anthraquinone dyes which may be used, those are the most important in which the anthraquinone system is not fused to one or more other ring systems.

The acylatable amino groups may be primary or secondary amino groups, and the anthraquinone dyes used may contain one or more acylatable amino groups.

Of the anthraquinone dyes containing acylatable amino groups those are preferably used which contain an amino group which can be reacted with acid halides and which is attached to the dye radical either directly or by way of a bridge member, such as a divalent aliphatic or aromatic radical. Particularly suitable initial materials for the production of the new dyes are those dyes in which the amino group which can be reacted with acid halides is attached to the dye radical by way of one of the following radicals: —NH—CO—C$_6$H$_4$—, —SO$_2$—NH—C$_6$H$_4$—, —CO—NH—C$_6$H$_4$—,

—NH—C$_6$H$_4$—

—SO$_2$—NH—(CH$_2$)$_n$—, —CO—NH—(CH$_2$)$_n$— or —O—(CH$_2$)$_n$—, $n$ representing an integer from 2 to about 4.

The water-soluble new anthraquinone dyes according to the invention are preferably used for dyeing wool and cellulose materials, such as cotton, rayon and rayon staple, whereas the dyes having little or no solubility in water are preferably used for dyeing synthetic textile materials, such as nylon 6, nylon 66, nylon 11 and polyethylene terephthalate. There are, however, exceptions to this rule.

Reaction of the anthraquinone dyes bearing amino groups with the above-specified acid halides is carried out under conditions usual for the reaction of acid halides with amines, for example in aqueous solution or slurry, in organic solvents or mixtures of water and organic solvents, advantageously in the presence of acid-binding agents, such as alkali hydroxides, alkali carbonates, alkali bicarbonates and alkali acetates, or tertiary bases, such as pyridine. In general, reaction in organic solvents or their mixtures with water is preferred.

The reaction may be conducted in homogeneous or heterogeneous phase. For example, the acid halide may be dissolved in a solvent miscible with water, for example in acetone, and the acetonic solution allowed to flow gradually into the aqueous solution of the dye. The reaction is preferably carried out at 10° to 15° C.; it is recommendable to maintain a pH value of between 6 and 7.

For acylation in heterogeneous phase, the solution of the acid halide in an organic solvent, for example in an aromatic hydrocarbon or in chloroform, as obtained in the preparation of the acid halide may be used without further working up. While stirring vigorously, the said solution is allowed to flow into the buffered aqueous solution of the dye, advantageously in the presence of a dispersing agent. The end point of the reaction may be determined by paper strip chromatograph.

Acid halides of the Formula II in which A stands for an aromatic radical are obtained, for example, from the corresponding 1 - (carboxyphenyl) - 4,5 - dichloropyridazones - (6) or 1 - (sulfophenyl) - 4,5-dichloropyridazones- (6) by reaction with halogenating agents, such as phosphorus oxychloride, phosphorus pentachloride or thionyl chloride. The 1-(sulfophenyl)-4,5-dihalogenpyridazones- (6) can be obtained, for example, by reacting a suitable aryl hydrazine with a mucohalic acid, for example with mucochloric or mucobromic acid, in aqueous mineral acid solution at room temperature and treating the reaction product with concentrated sulfuric acid or by heating a mucohalic acid with a suitable aryl hydrazine in aqueous mineral acid solution.

The corresponding sulfonic acid chlorides (B=—SO$_2$— in Formula II) may also be prepared, for example, by sulfochlorination of 1-phenyl-4,5 - dichloropyridazone- (6).

Acid halides of the Formula II in which A stands for an aliphatic radical are obtained, for example, by adding hydrazine onto an α,β-unsaturated nitrile and reacting the resultant substituted hydrazine with a mucohalic acid. The 4,5-dihalogenpyridazones-(6) thus obtained, which have an alkylnitrile group in the 1-position, are then converted by saponification into the corresponding carboxylic acids and by subsequent halogenation into the carboxylic acid halides.

The new anthraquinone dyes are especially suitable for dyeing and printing the above-mentioned kinds of textile material as well as leather. It is expedient to co-employ basic-reacting substances when dyeing and printing with the new dyes. Such substances are, for example, alkali metal hydroxides, such as sodium hydroxide and potassium hydroxide, alkali metal carbonates, such as sodium carbonate and potassium carbonate, alkali metal bicarbonates, such as sodium bicarbonate, and alkali metal acetates, such as sodium acetate, potassium acetate and sodium chloracetate.

When dyeing with the new anthraquinone dyes, the procedure may be, for example, that materials of cellulose are padded with an aqueous solution of the dye and, advantageously after drying, passed through an aqueous bath containing a basic-reacting substance, such as sodium hydroxide, sodium carbonate, sodium bicarbonate, sodium trichloracetate, potassium hydroxide or potassium carbonate, and the dye is fixed on the fiber by steaming for a short time. Instead of steaming, the material may be treated with air of between 70° and 200° C., preferably between 100° and 150° C., or the moist material padded with the coemployment of alkali hydroxides is allowed to stand for several hours at room temperature. The basic-reacting substance may, however, also be added to the padding bath. It is also possible to conduct dyeing with the new dyes, with the addition of basic-reacting substances and, advantageously, of neutral salts such as sodium chloride or sodium sulfate, at temperatures between 30° and 50° C. and to fix the dyes on the material by gradually raising the bath temperature. A further procedure consists in pretreating the cellulosic material with aqueous solutions of basic-reacting substances, drying the material, then dyeing it with the new dyes and fixing the dyes thereon.

In printing textile materials of cellulose, the anthraquinone dyes are adventageously brought onto the fiber together with a basic-reacting substance and thickening agents, such as sodium alginate or tragacanth, advantageously with the coemployment of a conventional printing auxiliary. The material is then dried at temperatures between 70° and 200° C., preferably between 100° and 150° C., or steamed for a short time. The materials may also be printed with the new dyes and a conventional printing auxiliary, dried, passed through an aqueous bath containing a basic-reacting substance, and then treated with air at temperatures between 70° and 200° C. or steamed at 105° C. It is also possible to pretreat the material with basic-reacting substances, print it with the new dyes together with thickening agents and, if desired, printing auxiliaries, and then dry or steam the material.

The invention is further illustrated, but not limited, by the following examples. The parts and percentages are by weight. Parts by volume have the same relation to parts by weight as the liter to the kilogram under normal conditions.

EXAMPLE 1

69 parts of 1-aminobenzene-4-carboxylic acid are diazotized in the usual manner and reduced with 230 parts of tin(II) chloride. 85 parts of mucochloric acid are added to the mixture, the whole is stirred for twenty hours at room temperature an the reaction product filtered off. After drying, the reaction product is introduced into 500 parts of concentrated sulfuric acid, while stirring. Stirring is continued for another twelve to fifteen hours. The mixture is then poured into ice water. 136 parts of 1-(4-carboxyphenyl)-4,5-dichloropyridazone-(6) being obtained as a pale yellow powder with a melting point of 314° to 316° C.

A mixture of 57 parts of 1-(4-carboxyphenyl)-4,5-dichloropyridazone-(6), 200 parts by volume of nitrobenzene, 70 parts of thionyl chloride and 2 parts of pyridine is heated for three hours at 95° C. After cooling the mixture to room temperature, the reaction product is filtered off and washed with a little ether. The reaction product is dried under reduced pressure, and 48 parts of the corresponding acid chloride 1-(4-chlorocarbonylphenyl)-4,5-dichloropyridazone-(6) are obtained. It has a melting point of 153° to 155° C.

A solution of 45.5 parts of the said acid chloride in about 400 parts by volume of tetrahydrofurane is allowed to flow, in the course of one hour, into a solution of 48.9 parts of 1-amino-4-(3-amino-4 - sulfophenylamino) - anthraquinone-2-sulfonic acid in 1,000 parts of water, the pH value of the mixture being maintained at 4 to 5 by simultaneous addition of 10% aqueous sodium carbonate solution. While maintaining the said pH value, the mixture is stirred for another four to five hours. The pH value is then raised to about 7 by adding sodium carbonate, and the dye formed which has the formula:

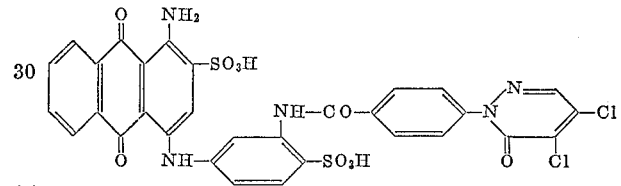

is precipitated in the form of its salt by adding a little potassium chloride. The dye is filtered off and washed with dilute aqueous potassium chloride solution. It dissolves in water giving a blue color and, in the presence of basic-reacting substances, dyes cotton fast blue shades.

Dyes with similar properties are obtained by using 1-amino-4 - (3-sulfo-4 - aminophenylamino)-anthraquinone-2-sulfonic acid, 1-amino-4-(3-sulfo-4-aminophenylamino) - anthraquinone-2,5- or -2,6-disulfonic acid, 1-amino-4-(3-amino-4-sulfophenylamino) - anthraquinone-2,5- or -2,6-disulfonic acid or 1,4-diaminonanthraquinone-2,5- or -2,6-disulfonic acid instead of 1-amino-4-(3-amino-4-sulfophenylamino)-anthraquinone-2-sulfonic acid.

Further similar dyes are obtained by using, instead of 11(4--chlorocarbonylphenyl) - 4,5-dichloropyridazone-(6), the same amount of 1-(3-chlorocarbonylphenyl-(4,5)-dichloropyridazone-(6) or the equivalent amount of 1-(4-chlorocarbonylphenyl)-4,5 - dibromopyridazone-(6).

1-(3 - chlorocarbonylphenyl)-4,5 - dichloropyridazone-(6) is prepared in the same manner as 1-(4-chlorocarbonylphenyl)-4,5-dichloropyridazone-(6) except that, instead of 1-aminobenzene-4-carboxylic acid, the same amount of 1-aminobenzene-3-carboxylic acid is used as initial material.

1-(4-chlorocarbonylphenyl)-4,5 - dibromopyridazone-(6) is also prepared in the same manner as 1-(4-chlorocarbonylphenyl)-4,5-dichloropyridazone-(6), the equivalent amount of mucobromic acid being used instead of mucochloric acid.

EXAMPLE 2

A solution of 37.4 parts of 1-(4-chlorosulfophenyl)-4,5-dichloropyridazone-(6) in 100 parts of acetone is allowed to flow, in the course of half an hour, into a neutralized solution of 53.3 parts of 1-amino-4-(3-sulfo-4-aminophenylamino) - anthraquinone-2-sulfonic acid in 1,500 parts of water. The mixture is stirred for eight hours at a pH value of 4 to 5, for ten hours at a pH value of 6 and for another two hours while heating it to 40° C. Then the mixture is filtered. From the filtrate, a dye of the formula:

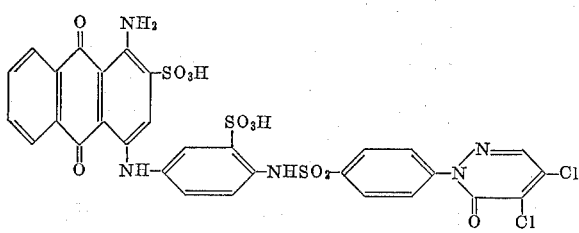

is precipitated in the form of its salt by adding sodium chloride. The dye is filtered off and dried under reduced pressure. In the presence of basic-reacting substances, it dyes cotton blue shades of excellent fastness.

1-(4-chlorosulfophenyl)-4,5-dichloropyridazone-(6) is obtained, for example, by introducing 82 parts of 1-phenyl-4,5 - dichloropyridazone-(6) into 150 parts of chlorosulfonic acid and heating the mixture for four to five hours at 100° to 120° C. The compound is colorless and has a melting point of 144° C.; the yield is 104 parts.

1-phenyl-4,5-dichloropyridazone-(6) is prepared as follows:

A solution of 11 parts of phenylhydrazine in 200 parts of water and 30 parts of hydrochloric acid is added to a solution of 17 parts of mucochloric acid in 100 parts of water. The mixture is stirred for one hour at room temperature and then heated, while stirring, for three hours at 90° to 100° C. The deposited reaction product is filtered off and dried. 19 parts of 1-phenyl-4,5-dichloropyridazone-(6) of the melting point 161° C. are obtained.

If the equivalent amount of mucobromic acid is used instead of mucochloric acid and the resultant 1-phenyl-4,5-dibromopyridazone-(6) is reacted with chlorosulfonic acid in the manner described above, 1-(4-chlorosulfophenyl)-4,5-dibromopyridazone-(6) is obtained.

Dyes with similar properties are obtained by using 1-amino-4-(3-sulfo-4-aminophenylamino) - anthraquinone-2-sulfonic acid, 1-amino-4-(3-sulfo-4-aminophenylamino)-anthraquinone-2,5- or -2,6-disulfonic acid, 1-amino-4-(3-amino-4-sulfophenylamino) - anthraquinone-2,5- or -2,6-disulfonic acid or 1,4-diaminoanthraquinone-2,5- or -2,6-disulfonic acid instead of 1-amino-4 - (3-amino-4-sulfophenylamino)-anthraquinone-2-sulfonic acid. Instead of 1-(4-chlorosulfophenyl)-4,5 - dichloropyridazone-(6), 1-(4-chlorosulfophenyl)-4,5-dibromopyridazone-(6) can be used with equally good results.

EXAMPLE 3

A mixture of 47.4 parts of β-(4,5-dichloropyridazonyl-1)-propionic acid of the formula:

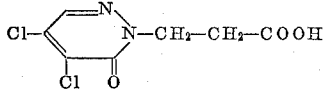

142 parts by volume of benzene and 71.4 of thionyl chloride is heated for three hours at the boil. Then the solvent and the excess thionyl chloride are distilled off on a water bath under reduced pressure, and the syrupy residue is dissolved in 70 parts by volume of acetone. This solution is allowed to flow, in the course of two hours, into a mixture of 53.3 parts of the disodium salt of 1-amino-4-(3-sulfo-4-aminophenylamino) - anthraquinone-2-sulfonic acid, 1,000 parts of water and 300 parts of ice, the pH value of the mixture being maintained at 6.5 to 6.7 by adding 233 parts by volume of a 10% aqueous sodium carbonate solution. The mixture is stirred for another half hour. Then a dye of the formula:

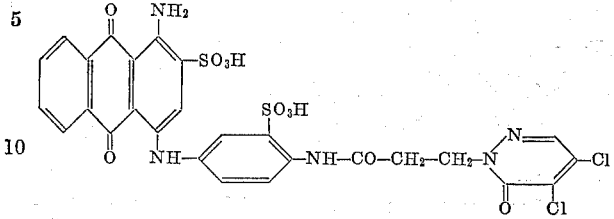

is separated in the form of its sodium salt by adding 283 parts of sodium chloride. The dye is filtered off and dried under reduced pressure. The new dye readily dissolves in water giving a blue color and, in the presence of basic-reacting substances, dyes cotton greenish-blue shades fast to wet treatment and light.

Dyes with similar properties are obtained by using 1-amino-4-(3-amino-4 - sulfophenylamino) - anthraquinone-2-sulfonic acid, 1-amino-4-(3-sulfo-4-aminophenylamino) - anthraquinone-2,5- or -2,6 - disulfonic acid, 1-amino-4-(3-amino - 4 - sulfophenylamino)-anthraquinone-2,5- or -2,6-disulfonic acid or 1,4-diaminoanthraquinone-2,5- or -2,6-disulfonic acid instead of 1-amino-4-(3-sulfo-4-aminophenylamino)-anthraquinone-2-sulfonic acid, or by using the equivalent amount of β-(4,5-dibromopyridazonyl-1)-propionyl chloride instead of β-(4,5-dichloropyridazonyl-1)-propionyl chloride.

β-(4,5-dichloropyridazonyl-1) - propionic acid is prepared as follows:

85 parts of 2-hydrazinopropionitrile (obtained by reaction of hydrazine hydrate with acrylonitrile) are allowed to flow into 500 parts of 8% hydrochloric acid, while stirring. 170 parts of mucochloric acid are added to this mixture, and the whole is heated for one hour at 90° C. After cooling, 210 parts of 1-(2-cyanoethyl)-4,5-dichloropyridazone-(6) are obtained as a colorless compound of the melting point 85° C.

β - (4,5 - dichloropyridazonyl-1-)-propionic acid of the melting point 127° C. is obtained by saponification of the said compound.

By reacting 2-hydrazinopropionitrile with the equivalent amount of mucobromic acid instead of with mucochloric acid and otherwise following the procedure described above, β - (4,5 - dibromopyridazonyl-1)-propionic acid is obtained, from which β-(4,5-dibromopyridazonyl-1)-propionyl chloride is prepared by reaction with thionyl chloride.

We claim:

1. An anthraquinone dye of the formula:

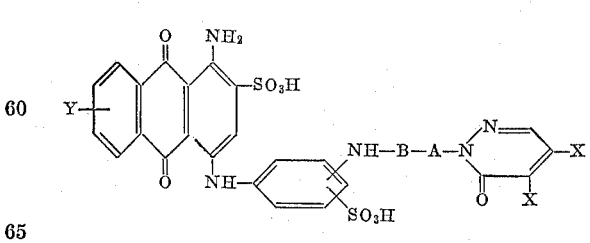

A represents a group selected from the class consisting of phenylene and ethylene, B represents a group selected from the class consisting of —SO₂—, —CO—, X represents a member selected from the group consisting of chlorine and bromine and Y prepresents a substituent selected from the group of hydrogen and sulfo.

wherein:
2. An anthraquinone dye of the formula:
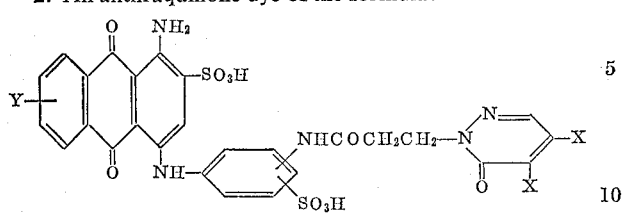
wherein:
X represents a member selected from the group consisting of chlorine and bromine and
Y represents a substituent selected from the group constiting of hydrogen and sulfo.
3. The dye of the formula:
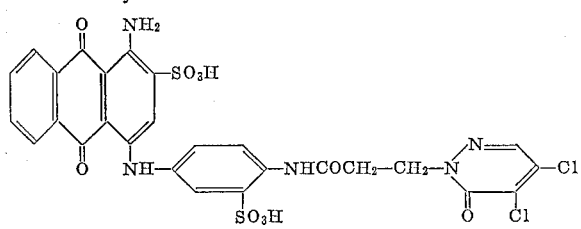
4. The dye of the formula:
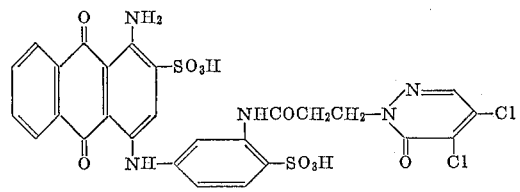
5. The dye of the formula:
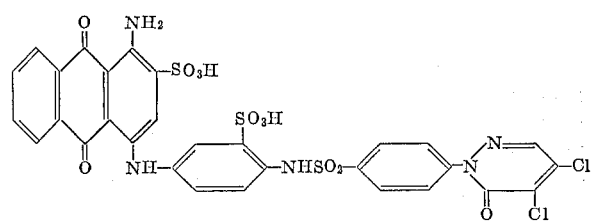
No references cited.
NICHOLAS S. RIZZO, *Primary Examiner.*